G. R. MATHESON & J. B. SHAW.
CONTROLLING DEVICE FOR AUTOMOBILE HEADLIGHTS.
APPLICATION FILED APR. 27, 1915.
1,211,474.
Patented Jan. 9, 1917.
2 SHEETS—SHEET 2.
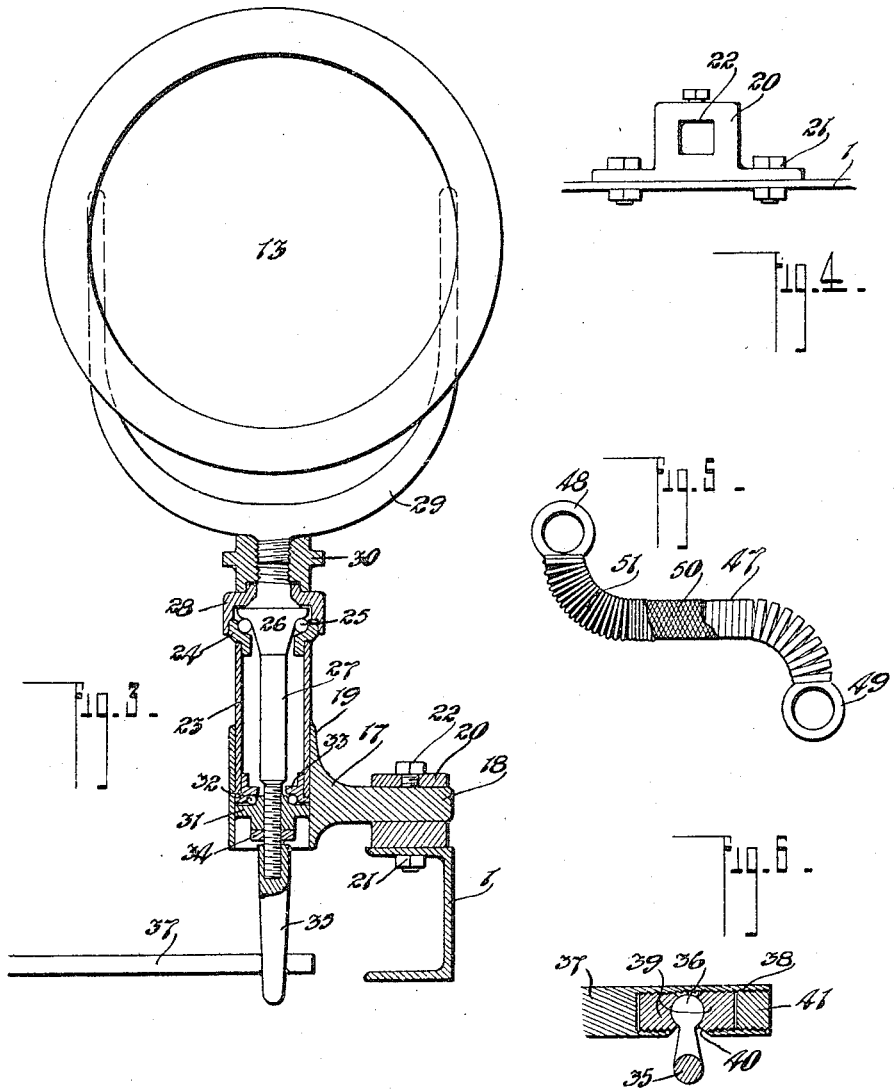

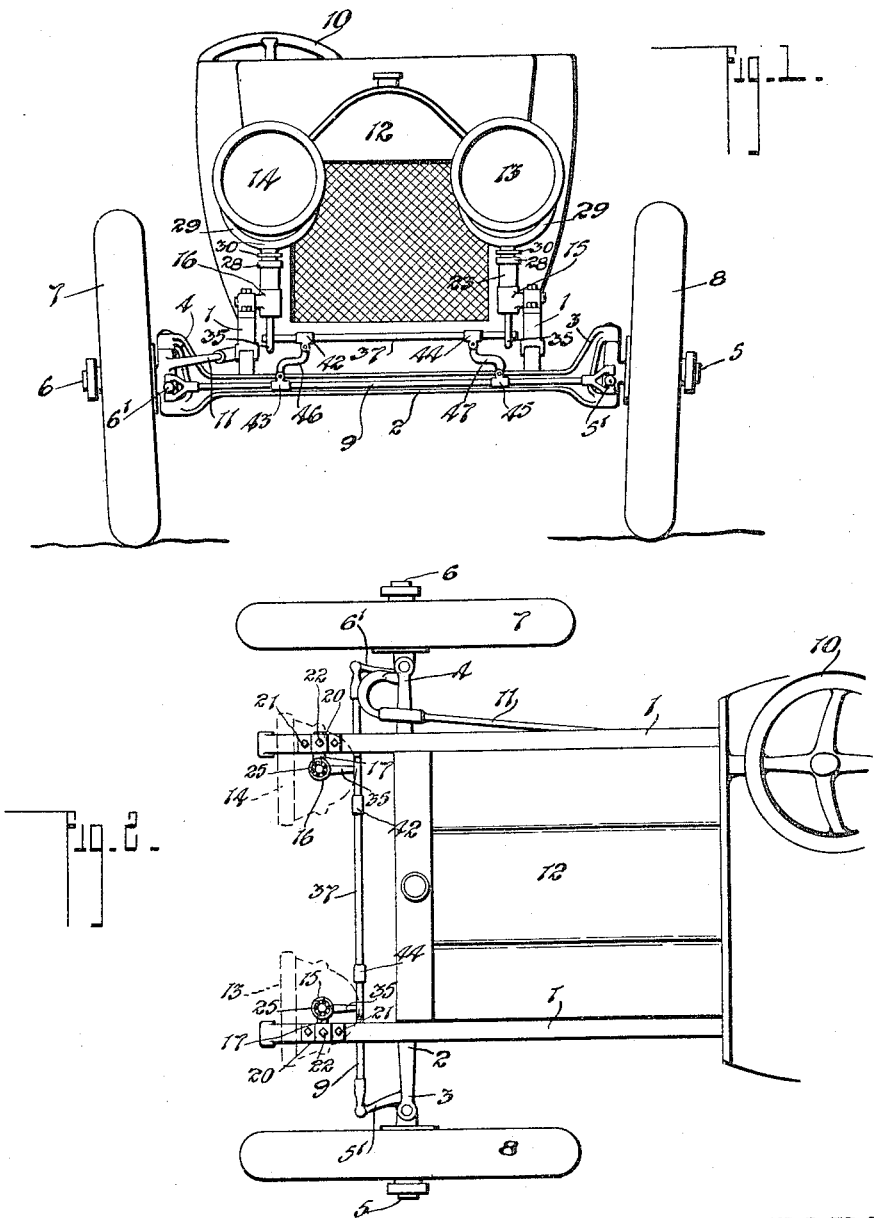

UNITED STATES PATENT OFFICE.

GILBERT ROBERT MATHESON AND JOSEPH BERTRAM SHAW, OF WINNIPEG, MANITOBA, CANADA.

CONTROLLING DEVICE FOR AUTOMOBILE-HEADLIGHTS.

1,211,474.  Specification of Letters Patent.  Patented Jan. 9, 1917.

Application filed April 27, 1915. Serial No. 24,302.

*To all whom it may concern:*

Be it known that we, GILBERT ROBERT MATHESON and JOSEPH BERTRAM SHAW, both of the city of Winnipeg, in the Province of Manitoba, Canada, have invented certain new and useful Improvements in Controlling Devices for Automobile-Headlights, of which the following is the specification.

The invention relates to improvements in controlling devices for automobile headlights and the object of the invention is primarily to provide an attachment to a headlight which will effect the turning of the headlights with the automobile wheels and thereby insure proper lighting on the roadway when making a turn or swerving to the side.

A further object of the invention is to provide an easily operated and positive device of this kind which can be readily applied on existing types of automobiles and which is simple in construction and has the parts thereof arranged so that they can be readily taken apart for repairing or other purposes.

With the above objects in view the invention consists essentially in the arrangement and construction of parts hereinafter more particularly described and later pointed out in the appended claims.

Figure 1 represents a front view of an automobile equipped with our controlling device, Fig. 2 is a plan view of the same, the headlights being shown in dotted outline and parts being removed to expose the upper ball bearings. Fig. 3 represents an enlarged detailed vertical sectional view through the support of the headlight, the headlight and other parts being shown in front elevation. Fig. 4 represents an enlarged detailed face view of one of the clamping blocks attached to the chassis. Fig. 5 represents an enlarged detailed plan view of one of the springs, parts being broken away to expose construction. Fig. 6 represents an enlarged detailed horizontal sectional view through one of the ball and socket joints.

In the drawings like characters of reference indicate corresponding parts in each figure.

1 represents the chassis of an automobile and 2 the front axle having the ends thereof fitted with the usual yokes 3 and 4 which carry the steering spindles 5 and 6 on which are mounted the front wheels 7 and 8 in the ordinary manner. The forward arms 5' and 6' of the spindles are connected by a steering rod 9 whereby the axles are caused to swing together and one of the spindles is controlled from the steering wheel 10 directly through a connection 11. We have not considered it necessary to enter into the details of this connection as the parts hereinbefore described form no part of our invention but are simply shown so that the complete structure and mode of operation can be better understood.

12 represents the ordinary radiator of an automobile.

13 and 14 are the automobile headlights, these headlights being suspended from the chassis by supports 15 and 16. The supports are identical in construction so that it is only necessary to describe one of them in detail.

Reference is now made particularly to Fig. 3 of the drawings wherein one of the supports is shown in vertical section. It comprises a hanger 17 presenting a squared arm 18 and a vertically disposed sleeve 19, the arm being received within a square socket formed in a carrying block 20 permanently fastened by means of bolts 21 to the chassis. A tightening screw 22 is provided to retain the arm within the socket. 23 is a more or less short tubular body piece having the lower end thereof permanently secured within the sleeve, this being accomplished, preferably, by brazing it within the sleeve. 24 is an annular ball bearing resting on the upper end of the body piece and forming a raceway for balls 25, the balls carrying a cone 26, the said cone being formed as an enlargement at the upper end of a vertically disposed spindle 27 passing centrally through the body piece. The cone is held in position by an engaging cap screw 28 screw threaded onto the bearing 24. 29 is a lamp bracket carrying the headlight, the bracket being fastened to the upper end of the spindle by means of a coupling 30. The lower end of the spindle is contracted to receive a second or lower ball bearing 31 providing a raceway for balls 32, the balls being retained in position by a second cone 33 located at the lower end of the body piece. A lock nut 34 is screwed onto the lower end of the spindle and jammed against the bearing 31. 35 is an L-shaped crank having one end screw threaded onto the lower end of the spindle and the other end formed into a ball 36. The above completes the description of the supports and it is to be noticed that when the headlights are facing directly to the front, the ball ends of the franks 35 are directed rearwardly.

The cranks are connected together by a controlling rod 37 having the ends cored out and internally screw threaded as indicated at 38, to receive a two piece socket 39 in which is admitted, in each instance, the ball end of the crank. In this connection we might explain that one of the socket members is first screwed into the end of the controlling rod, the ball end of the crank is then passed into the open end of the rod through an opening 40 formed in the side thereof and the second socket member is then screwed in against the ball to complete the socket and the fastening of the ball end of the crank to the controlling rod.

41 is a screw threaded closure plug inserted in the extreme end of the controlling rod.

42 and 43 and 44 and 45 are similar pairs of collars permanently fastened to the controlling rod and to the steering rod, it being noted that the lower collars are farther to the side than the upper collars. The pairs of collars are connected by suitably shrouded, strong coiled springs 46 and 47, the ends of the springs being formed into eyes 48 and 49 which are suitably pinned pivotally to the collars.

In actual practice we prefer to inclose the springs within a fabric covering 50 around which we wind a protecting wire 51 (see Fig. 5). These springs form an operating connection between the controlling and steering rods, and are flexible enough so that slight twists of the wheels will not be transmitted to the headlights.

It is remarked that after automobiles have been in use for a short time, there is always more or less looseness in the steering gear which results in the front wheels having a slight looseness, so to speak, which cannot be controlled by the hand wheel. It is this looseness which we desire to take up in the connecting springs 46 and 47. With our controlling device applied on an automobile, the headlights are caused to swing with the wheels, as it is obvious that any turning movement transmitted to the wheels from the steering wheel 10 is imparted directly from the steering rod, through the controlling springs, to the controlling rod and the controlling rod effects the turning of the headlights through the cranks. Accordingly the headlights will be kept directly on the roadway at all times during the operation of the automobile.

What we claim as our invention is:—

1. A device of the class described including a rod arranged to move transversely of the direction of vehicle motion, a plurality of headlights revolubly mounted on the vehicle and a rod connecting said lights together, of oppositely disposed spirally coiled S-shaped springs inserted between the rods and with their ends connected thereto and having the body portion thereof normally parallel with the rods.

2. The combination with a vehicle having movable wheels, a rod connecting said wheels and arranged to move transversely of the direction of vehicle motion, a plurality of headlights revolubly mounted on the vehicle and a rod connecting said headlights together, of pairs of collars permanently secured to the rods and a pair of oppositely disposed shrouded coiled springs inserted between the rods and having their ends terminating in eyes pivotally fastened to the collars, said springs being positioned such that the body portions thereof pass normally in a direction parallel with the rods.

Signed at Winnipeg this 29 day of January 1915.

GILBERT ROBERT MATHESON.
JOSEPH BERTRAM SHAW.

In the presence of—
GERALD S. ROXBAUGH,
ROLAND FOSTER.

Copies of this patent may be obtained for five cents each, by addressing the "Commissioner of Patents, Washington, D. C."